SWITCHING SYSTEMS BETWEEN MULTIPLEX COMMUNICATION CHANNELS

Filed Oct. 19, 1959 11 Sheets-Sheet 1

Inventor
E.TOURATON-
J.P.LECORRE
By [signature]
Agent

Aug. 14, 1962 E. TOURATON ET AL 3,049,593

SWITCHING SYSTEMS BETWEEN MULTIPLEX COMMUNICATION CHANNELS

Filed Oct. 19, 1959 11 Sheets-Sheet 2

Inventor
E.TOURATON-
J.P.LECORRE
By [signature]
Agent

SWITCHING SYSTEMS BETWEEN MULTIPLEX COMMUNICATION CHANNELS

Filed Oct. 19, 1959 11 Sheets-Sheet 3

Inventor
E. TOURATON-
J. P. LECORRE
By [signature]
Agent

SWITCHING SYSTEMS BETWEEN MULTIPLEX COMMUNICATION CHANNELS

Filed Oct. 19, 1959 11 Sheets-Sheet 4

Inventor
E.TOURATON-
J.P.LECORRE
By [signature]
Agent

SWITCHING SYSTEMS BETWEEN MULTIPLEX COMMUNICATION CHANNELS

Inventor
E.TOURATON-
J.P.LECORRE
By Paul Henninger
Agent

| 1 JSsb | 2 JEsb | 3 VEex | 4 JSsa | 5 VEex |
|---|---|---|---|---|
| S1 | E5 | e.4 | S7 | e.6 |
| S2 | E8 | e.5 | S1 | e.11 |
| S3 | E2 | e.12 | S5 | e.18 |
| S4 | E7 | e.8 | | |
| S5 | E4 | e.10 | S3 | e.7 |
| S6 | | | | |
| S7 | E9 | e.16 | S4 | e.14 |
| S8 | E0 | e.3 | S0 | e.15 |
| S9 | E6 | e.1 | S6 | e.19 |
| S0 | E3 | e.4 | S9 | e.5 |

FIG. 6.

| JE | JSsb | JSsa |
|---|---|---|
| E1 | | |
| E2 | S3 | S5 |
| E3 | S0 | S9 |
| E4 | S5 | S3 |
| E5 | S1 | S7 |
| E6 | S9 | S6 |
| E7 | S4 | |
| E8 | S2 | S1 |
| E9 | S7 | S4 |
| E0 | S8 | S0 |

FIG. 7.

| JE | JSsb | JSsa |
|---|---|---|
| E1 | S2 | |
| E2 | S3 | S5 |
| E3 | S0 | S9 |
| E4 | S5 | S3 |
| E5 | S1 | S7 |
| E6 | S9 | S6 |
| E7 | S4 | |
| E8 | S2 | S1 |
| E9 | S7 | S4 |
| E0 | S8 | S0 |

FIG. 8.

| JE | JSsb | JSsa |
|---|---|---|
| E1 | S2 | |
| E2 | S3 | S5 |
| E3 | S0 | S9 |
| E4 | S5 | S3 |
| E5 | S1 | S7 |
| E6 | S9 | S6 |
| E7 | S4 | |
| E8 | S1 | S2 |
| E9 | S7 | S4 |
| E10 | S8 | S0 |

FIG. 9.

| JE | JSsb | JSsa |
|---|---|---|
| E1 | S2 | |
| E2 | S3 | S5 |
| E3 | S0 | S9 |
| E4 | S5 | S3 |
| E5 | S7 | S1 |
| E6 | S9 | S6 |
| E7 | S4 | |
| E8 | S1 | S2 |
| E9 | S7 | S4 |
| E0 | S8 | S0 |

FIG. 10.

*Inventor*
E. TOURATON-
J. P. LECORRE
By [signature]
Agent

| JE | JSsb | JEsa |
|---|---|---|
| E1 | S2 | |
| E2 | S3 | S5 |
| E3 | S0 | S9 |
| E4 | S5 | S3 |
| E5 | **S7** | **S1** |
| E6 | S9 | S6 |
| E7 | S4 | |
| E8 | **S1** | **S2** |
| E9 | **S4** | **S7** |
| E0 | S8 | S0 |

FIG. 11.

| JE | JSsb | JSsa |
|---|---|---|
| E1 | S2 | |
| E2 | S3 | S5 |
| E3 | S0 | S9 |
| E4 | S5 | S3 |
| E5 | **S7** | **S1** |
| E6 | S9 | S6 |
| E7 | | **S4** |
| E8 | **S1** | **S2** |
| E9 | **S4** | **S7** |
| E0 | S8 | S0 |

FIG. 12.

FIG. 16.

| JSsb | JEsasb | VEex | JSsa | VEex |
|---|---|---|---|---|
| S1 | E8 | e.11 | S2 | e.5 |
| S2 | E1 | e.4 | | |
| S3 | E2 | e.12 | S5 | e.18 |
| S4 | E9 | e.14 | S7 | e.16 |
| S5 | E7 | e.10 | S4 | e.8 |
| S6 | E7 | | S4 | e.8 |
| S7 | E5 | e.6 | S1 | e.4 |
| S8 | E0 | e.3 | S0 | e.15 |
| S9 | E6 | e.1 | S6 | e.19 |
| S0 | E3 | e.4 | S9 | e.5 |

Inventor
E.TOURATON-
J.P.LECORRE
By [signature]
Agent

*Inventor*
E. TOURATON-
L. P. LECORRE
By [signature]
Agent

Inventor
E.TOURATON-
L.P.LECORRE
By [signature]
Agent

FIG. 15.

| | Sb | | | Sa | | |
|---|---|---|---|---|---|---|
| | | | | | | |
| T31 | LA2-X | S2 | E8-e.5 | | | |
| T32 | LA2-X | S2 | E8-e.5 | | | |
| T33 | LA2-2 | S2 | E8-e.5<br>E8-e.4 | LA2-X | S2 | |
| 1st CYCLE | LA1-y | S1 | E5-e.4 | LA1-r | S1 | E8-e.11 |
| T33 2nd CYCLE | LA2-2 | S2 | E1-e.4 | LA2-X | S2 | E8-e.5 |
| | LA1-r | S1 | E5-e.4<br>E8-e.11 | LA1-y | S1 | E5-e.4 |
| | LA7-v | S7 | E9-e.16 | LA7-u | S7 | E5-e.6 |
| T33 3rd CYCLE | LA1-r | S1 | E8-e.11 | LA1-y | S1 | E5-e4 |
| | LA7-u | S7 | E9-e.16<br>E5-e.6 | LA7-v | S7 | E9-e.16 |
| | LA4-t | S4 | E7-e.8 | LA4-z | S4 | E9-e.14 |
| T33 4th CYCLE | LA7-u | S7 | E5-e.6 | LA7-v | S7 | E9-e.16 |
| | LA4-z | S4 | E7-e.8<br>E9-e.14 | LA4-t | S4 | E7-e.8 |
| T4 | LA4-z | S4 | E9-e.14 | LA4-t | S4 | E7-e.8 |

Inventor
E. TOURATON-
L. P. LECORRE
By [signature]
Agent

Inventor
E. TOURATON-
L. P. LECORRE
By [signature]
Agent

United States Patent Office 3,049,593 Patented Aug. 14, 1962

3,049,593

SWITCHING SYSTEMS BETWEEN MULTIPLEX COMMUNICATION CHANNELS

Emile Touraton, Paris, and Jean Pierre Le Corre, Verrieres-le-Buisson, France, assignors to International Standard Electric Corporation, New York, N.Y.

Filed Oct. 19, 1959, Ser. No. 847,322
Claims priority, application France Oct. 21, 1958
6 Claims. (Cl. 179—15)

Figure 1:
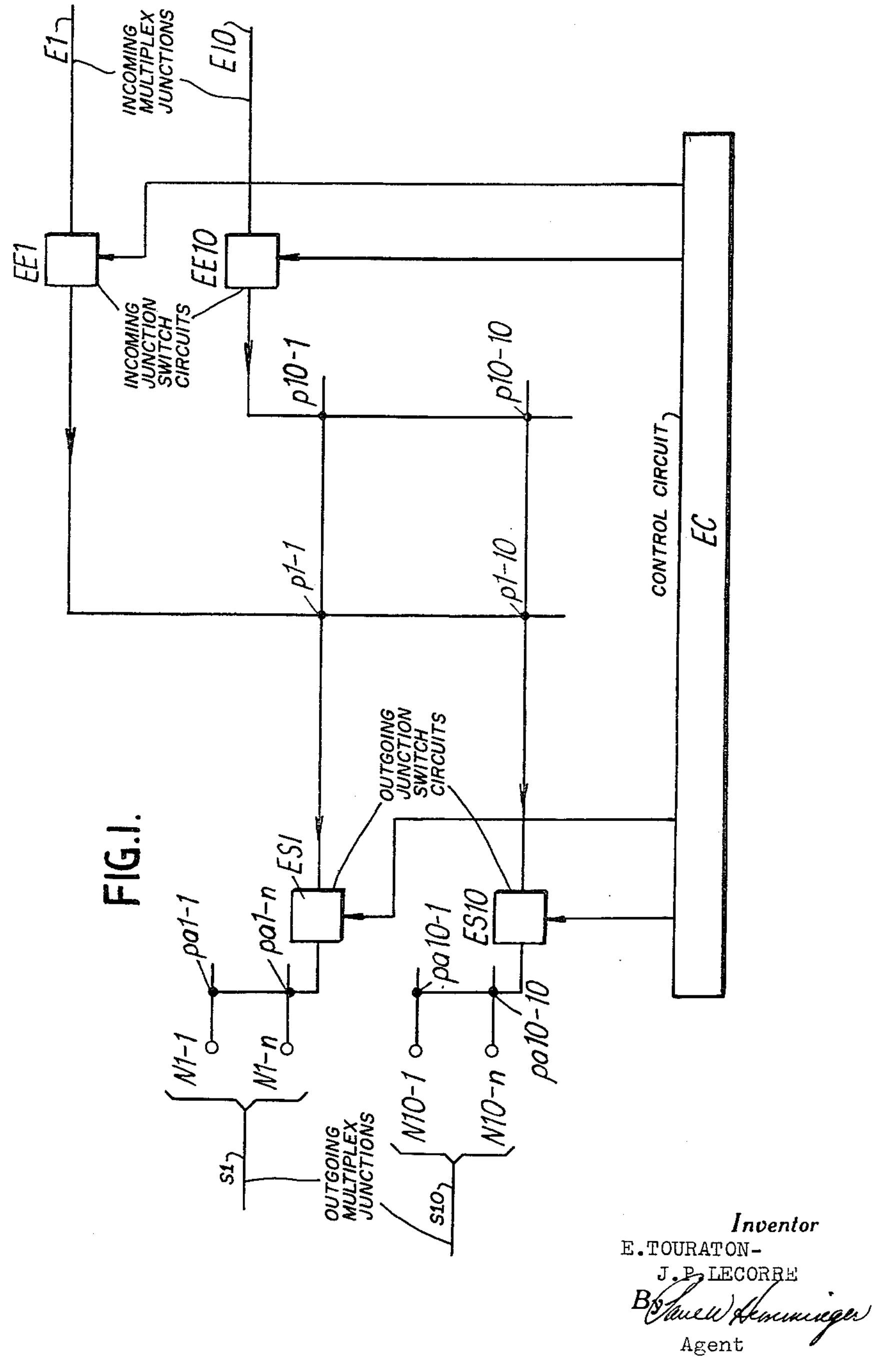

The present invention concerns switching systems between multiplex communication channels and more particularly time division multiplex channels.

Generally a communication channel on which several communications are transmitted simultaneously is designated under the name of multiplex junction. In time division multiplex systems the *n* signals which are to be transmitted simultaneously are sampled at each repetition period of the system, the information obtained by sampling for each signal is then coded and these *n* coded informations are transmitted successively during one repetition period. Several arrangements for carrying out switchings between multiplex junction groups are known. In order to review the principle of such switching arrangements one will consider for example, the case of *n* incoming multiplex junctions E1 to E*n*, each one comprising *m* multiplex channels $e_1$ to $e_m$. Each one of the incoming channels may have access by means of the switching devices to the *n* multiplex channels $s_1$ to $s_n$ of *p* outgoing multiplex junctions $S_1$ to $S_p$. Each repetition period of the system, comprises *m* elementary times. The incoming and outgoing junctions operate in synchronism, and it will be assumed that the signals corresponding to the channels *e.i* or *s.i* are transmitted at the *i*th elementary time of each repetition period. When signals such as speech signals are to be transmitted, the speeds at which the switches have to operate, make it necessary to use electronic gates as switching means. In the case under consideration, each of the incoming junctions *n* has access to the *p* outgoing junctions, by means of *p* electronic gates, for example the incoming junction E.*u* has access to the *p* outgoing junctions by means of *p* electronic gates P*u*–1 . . . P*u*–*p*. When it is required to link the *e.i* channel of the incoming junction E*v*, to the *s.i* channel of the outgoing junction S*w*, it is sufficient to open the electronic gate P*v*–*w* at the instant *i*. In the switching systems, the incoming channel for example, *e.i*–E.*v* is often predetermined, and it is sought to dispatch the communication through anyone of the channels of an outgoing junction S*w*, since all the channels of this outgoing junction, give generally access to a same direction. If on the outgoing junction S*w* the channel *s.i* corresponding to the same time position as the channel on the incoming way (*e.i*), is free, it is sufficient to control the opening of the electronic gate P*v*–*w* at the time position *i*, in order to set up the communication. If the channel *s.i* is not free, the communication cannot be established in this way.

In order to overcome this difficulty it has been proposed to associate a circuit with each incoming junction which comprises memories in which it is possible to store the information appearing on all or part of the incoming channels. In this case, and reconsidering the preceding example, if the channel *s.i* of the outgoing junction S*w* is not free and if the channel *s.j* is free, the information arriving on the incoming channel *e.i* of the junction E.*v* is stored at the time interval *i*, and at the time position *j*. The information stored at the time interval *i* is extracted from the memory associated at the incoming junction E*v*, and at the same time the electronic gate P*v*–*w* is opened. Such a process substantially delays the transfer of information appearing on the channels of the incoming junctions in order to enable their carry over to the outgoing junctions. This method which enables a better utilisation of the switching systems between multiplex channels involves however limitations resulting from an internal blocking.

Figure 2:
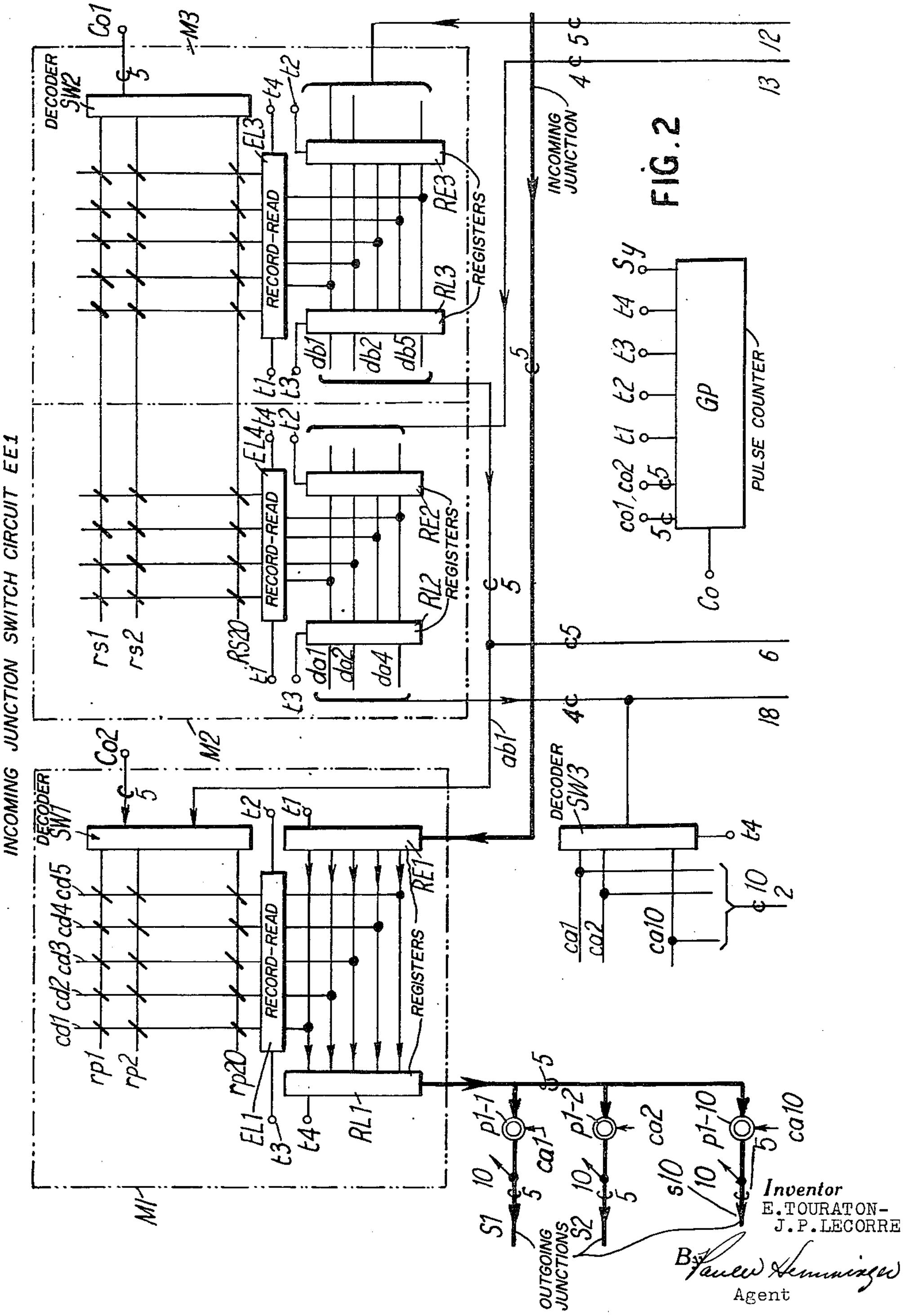
Figure 13:
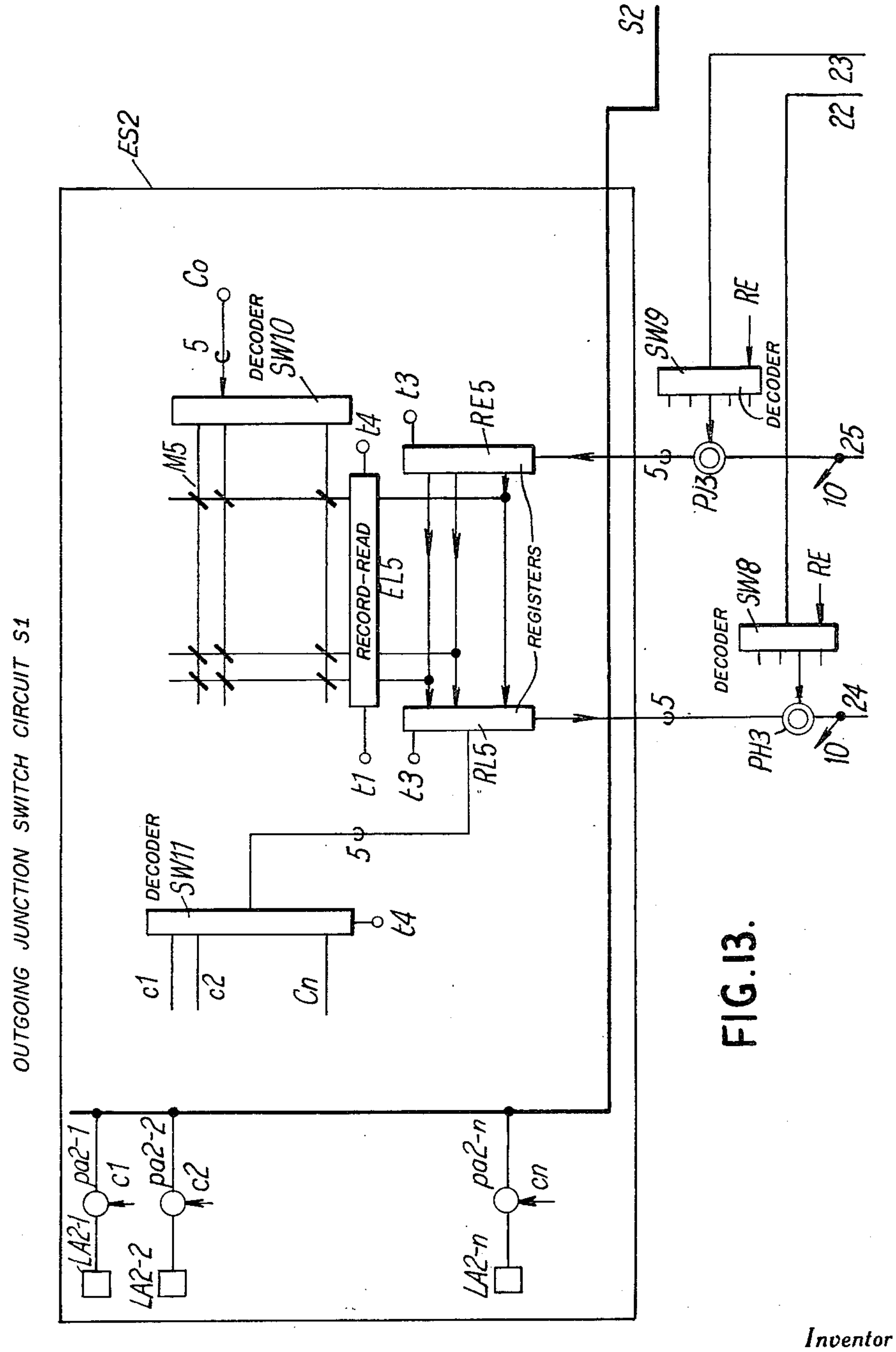

The invention will be particularly described with reference to the accompanying drawings in which:

FIG. 1 shows diagrammatically a switching arrangement according to the present invention, FIG. 2 shows the switching circuit associated with an incoming junction, FIGS. 3, 4, 5 and 14 show the control circuit associated with the circuits of the incoming junctions and with the circuits of the outgoing junctions, FIG. 13 shows the circuit associated with an outgoing junction, FIGS. 6, 7, 8, 9, 10, 11, 12, 15 and 16 are tables giving the switching programme at different stages of operation.

Figure 17:
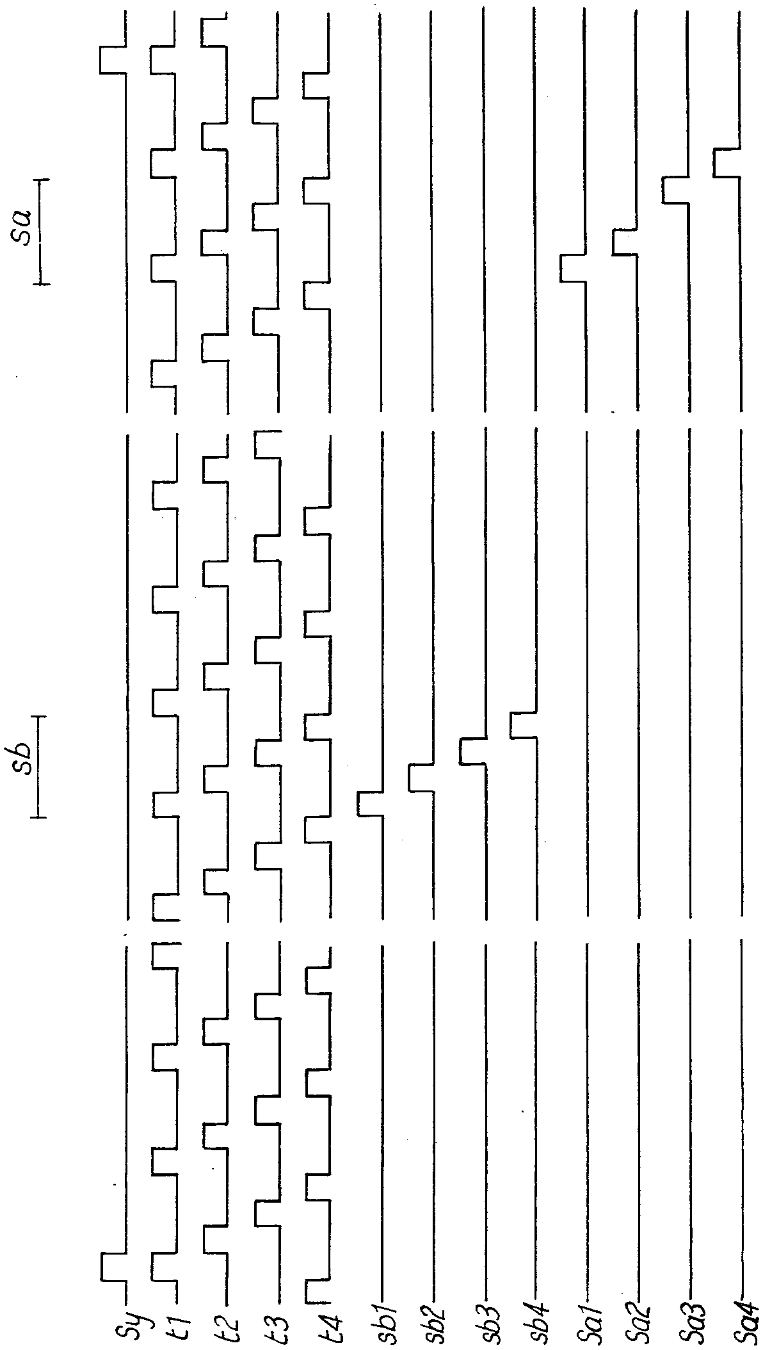

FIG. 17 shows impulse diagrams used for explaining the operation of the circuit of FIGS. 2, 3, 4, 5, 13 and 14.

An example of realization of the switching system making use of the invention, is shown diagrammatically on FIG. 1. It is designed for setting up connections between two groups of time division multiplex junctions. As it will be known, a multiplex junction is a transmission medium on which are transmitted simultaneously several communications.

Each repetition period of the system is divided into time intervals, in number equal to the number of communication channels, each interval usually called one time position assigned to a communication channel. To put it into an actual form, but without limitation whatsoever to the field of application of the invention, a typical example will be considered in the following description consisting of a multiplex junction comprising twenty channels, and a transmission system in which the repetition period is 100 microseconds, so that 5 microseconds are assigned to each one of the channels. It will also be assumed that all the multiplex junctions, the incoming as well as the outgoing operate in synchronism.

In the example shown on FIG. 1, ten incoming muliplex junctions E1 to E10 have been considered, each one of these junctions being associated with its respective circuit EE1 to EE10. The twenty channels on each one of these incoming junctions will be designated, further on in the description, by "incoming channels" and are identified by the time position assigned to them. In the same way, then outgoing junctions S1 to S10 have been considered and the twenty channels on each one of the outgoing junctions will be designated by "outgoing channels" and are identified in the same way as the incoming channels. The outgoing junctions end in switching equipments indicated respectively by ES1 to ES10, which have been shown in order to materialise the operation of the system and which carry out the required switching for shifting the multiplex junction to non-multiplex transmission channels, commonly called "normal transmission channels."

The normal transmission channels are associated with the circuit ES1 and with the outgoing junction S1 and are shown as N1–1 to N1–*n* and those associated with the circuit ES10 have been shown as N10–1 to N10–*n*. The incoming junction E1 can be connected to any of the outgoing junctions S1 to S10 through the electronic gates *p*1–1 to *p*1–10 and the incoming junction E10 can be connected to any outgoing junction through the electronic gates *p*10–1 to *p*10–10. As will be explained in detail in relation with the FIGS. 2, 3, 4, 5, 13 and 14, the electronic gates which connect an incoming junction such as E1 with any of the ten outgoing junctions are controlled by the circuit such as EE1 associated with this incoming junction. In the same way, the electronic gates such as *pa*1–1 to *pa*1–*n* by means of which the outgoing junction S1 can be connected to anyone of the normal transmission channels N1–1 to N1–*n* are under the control of the circuit ES1 associated with outgoing junction S1.

The operation of the circuits associated with the incoming junctions and the outgoing junctions is controlled from a common circuit shown in EC which receives the information required for setting up the connection.

The operation of the system shown on FIG. 1 will be now explained briefly. The control circuit EC which may be common to several switching assemblies, such as the one shown, receives the following conformation in order to set up a communication:

(1) The identity of the incoming junction and the time position within a repetition period to which this incoming channel presents itself.

(2) The identity of the normal transmission channel through which a connection must be set up. The circuit EC may, either deduct from this information or receive from a central circuit, the identity of the outgoing junction through which this communication is to be dispatched.

It will be assumed for example that the incoming channel which presents itself in the time position No. 4 on the channel E1, must be connected with the normal transmission channel N10–*n* and this necessarily through the outgoing junction S10. The control circuit EC checks to determine that at least one outgoing channel is free on the outgoing junction S10. If no outgoing channels on junction S10 are free, the connection cannot be set up. This checking is carried out by the circuit EC through the circuits EE1 to EE10, as it will be explained in detail later on and by setting up selectively a connection between the outgoing junction S10 and the circuit EC.

When a free outgoing channel exists on the outgoing junction the circuit EC transmits the identity of the outgoing channel and junction to the circuit EE1 associated with the incoming junction E1. Each circuit, such as EE1, associated with an incoming junction E1, is constituted mainly of two memories each one comprising as many compartments as there are a number of channels on the associated incoming junction. In the first one of these memories, each compartment is assigned to an incoming channel, and the informations appearing on these channels are recorded in the corresponding compartments. The second memory comprises the same number of compartments and these compartments are assigned to time positions.

The identity of the outgoing junction through which the communication must be set up and the identity of the incoming channel with which the connection must bet set up are registered in each compartment. From the time position, within a repetition period corresponding to an outgoing channel, is extracted the contents of the associated compartment of the second memory. The information about the identity of the outgoing junction is used for controlling at that time position the opening of the electronic gate connecting the output of the first memory to the outgoing junction. The information on the incoming channel is used for inducing the reading in the compartment of the first memory corresponding to this incoming channel, of the information registered therein. This information which appears at the output of the first memory is thus transmitted on the outgoing junction at this time position. One can understand that the second memory must be provided with non-destructive read-out, whereas the first memory is provided with destructive read-out. In other words, the information appearing on the incoming channels are recorded and are transmitted on the outgoing channels at different time positions, and this in accordance with information supplied by the central circuit EC for the setting up of the communication.

The common circuit EC transmits to the circuit ES10 which ends in the outgoing junction S10, the identity of the outgoing channel on which the communication presents itself, and the identity of the normal transmission channel with which the connection must set up. The circuit ES10 is provided for controlling at the time position corresponding to the outgoing channel on the junction S10, the opening of the electronic gate provided between this outgoing junction and the normal transmission channel with which the connection must be set up.

A system such as the one described involves disadvantages owing to the fact that an internal blocking appears rapidly and impedes an optimum utilisation of the switching system. The blocking appears for example in the following case: when it is required to set up a connection from a channel on an incoming junction through an outgoing junction comprising free outgoing channels in the time positions, for example 6 and 10, and if these positions are already utilised for setting up connections between this incoming junction and respectively two other outgoing junctions, it is not possible to set up this connection since one may be led to read at the same time position two compartments of the first memory and to open simultaneously two electronic gates in parallel connecting the outlet of this memory to two outgoing junctions. However, if a free channel exists on the outgoing junction through which the communication must be set up, it can be shown mathematically that provided a modification is made in the time positions at which some of the existing connections are set up, it is possible to find a time position on the outgoing junction at which the new communication may be set up, and which does not interfere with the connections already set up. Means for carrying out this modification will be described in detail in relation with the FIGS. 2 and 15. On the other hand, it is to be noted that in this case, each modification brought to a pair of connections, must be signalled to the circuits such as ES1 and ES10, in such a way as the required modifications should be brought to these circuits in order to maintain the connection set up with a normal transmission channel. Means enabling the control of these modifications in the circuits ES1 to ES10 are also described in detail, in relation with the FIGURES 2 to 15.

The operation of the circuit shown on FIGS. 2 to 7 which makes use of characteristics of the invention, will be now described in detail. On the drawings symbol diagrams have been used to represent classical electronic elements. An electronic gate of any type whatsoever is represented by a circle associated with radial conductors. The incoming conductors carry an arrow the end of which touches the circle, and the outgoing conductor an arrow in an opposite direction. Whenever the circle has no special indication, this electronic gate is a coincidence gate, i.e. that a signal has to be applied on each one of the incoming conductors in order to obtain a signal on the outgoing conductor. In some cases, an electronic gate has been represented by two concentric circles, in order to indicate that it concerns several electronic gates controlled in parallel, one of the incoming conductors carries in this case a figure which indicates the number of conductors, controlled simultaneously. When an electronic gate known as mixer is concerned, for example, an electronic gate which supplies an output signal, when a signal is applied to one of its incoming conductors, the numeral 1 is shown inside the circle. On the other hand, a blocking signal is sometimes used, induces the closing of the gate whatever the signals applied to the other incomings are. The conductor on which the blocking signal is applied in indicated by a small perpendicular bar. In all the circuits, the information which appears either on the multiplex channels between which the switchings are carried out, or inside the logic circuit for the purpose of controlling these switchings are in a coded form, per example, to each information element corresponds a group of impulses. It may be assumed, per example, that the binary code is used and that the impulses making up the code of an information element are transmitted, either one after the other on one single conductor, or simultaneously on as many conductors as there are binary figures in the code. In the example considered it has been assumed that the information was transmitted in parallel on the junctions and that in the common control circuit the signals were also transmitted in a parallel form. However, in order to simplify the details only one single conductor surrounded by a circle associated to a figure indicating the number of conductors, has been shown in all the cases.

Figure 4:
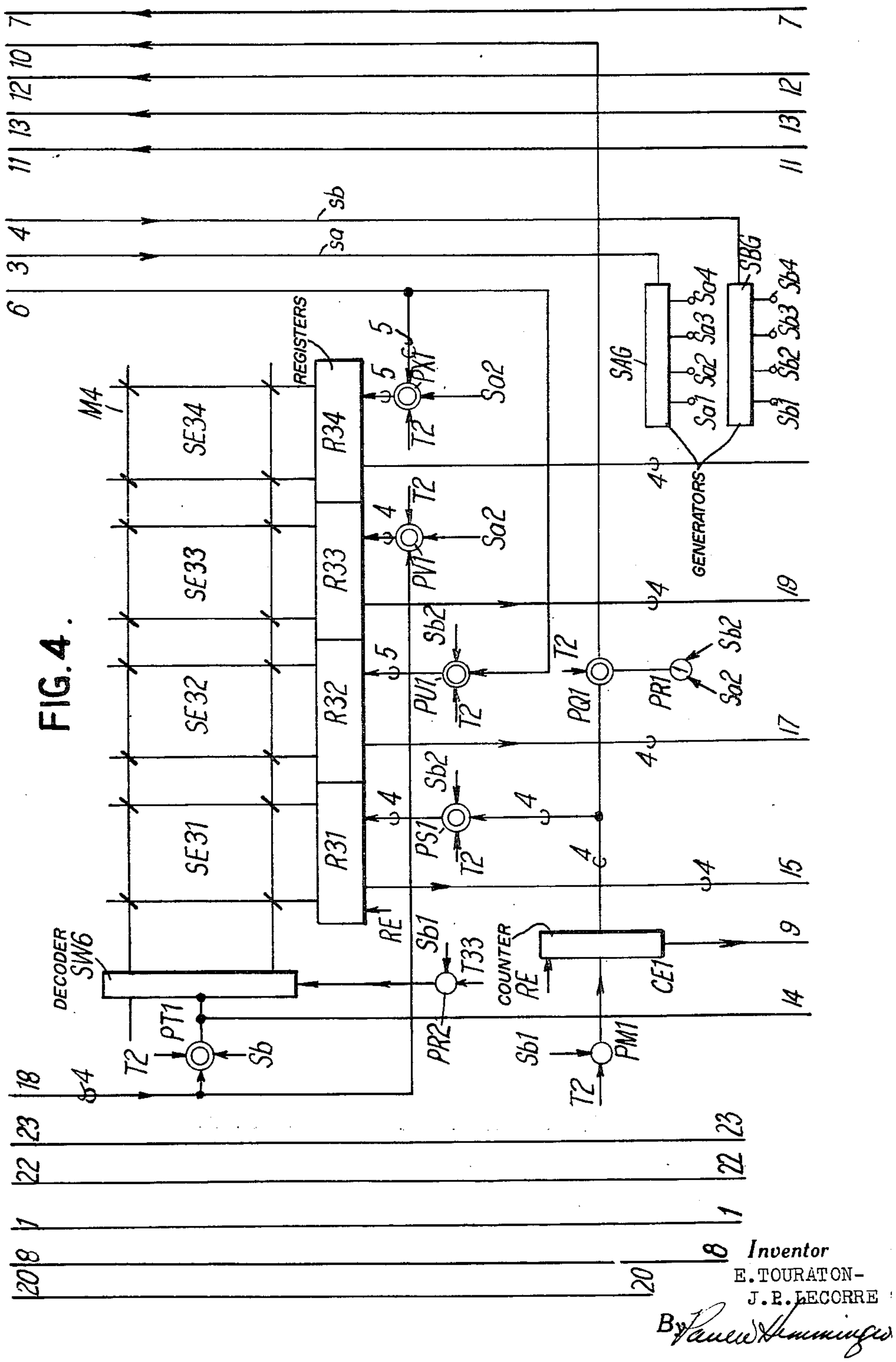

Memories each one comprising a certain number of compartments, have also been used in the FIGS. 2, 4 and 13. These memories may be of any type whatsoever, however, in order to express it typically, memories making use of matrices with rectangular hysteresis cycle magnetic cores have been considered, and each compartment is constituted by the magnetic cores arranged on a same line. The information contained in a compartment is extracted by applying a signal to the horizontal conductor passing through the magnetic cores of this compartment.

Referring for example to FIG. 2, a magnetic memory M1 comprising 20 compartments each one of 5 binary digits, has been shown on the top at the left hand side. The horizontal lines *rp*1 to *rp*20 are controlled by a circuit SW1 which receives under any form whatsoever for example under a coded form, the identity of the compartment which is to be read and which in response applies a reading signal to the corresponding horizontal conductor. The conductors of the columns *cd*1 to *cd*5 pass through the magnetic cores arranged on a same column and end on a recording and reading circuit EL1. This circuit is associated to a reading store RL1 and to a recording store RE1. Each store is a provisional memory circuit in which information may be stored, either after having been extracted from the memory (register RL1), pending their transmission at the suitable instant, or pending their recording in the memory (register RE1). The recording and the reading being carried out, in the case of the memory M1, at each operation period of the system. The stores RE1 and RL1 have control terminals *t*1 and *t*4 which control recording in store RE1 and reading-out from store RL1. The circuit EL1 is the circuit associated with the magnetic core matrix which applies suitable signals in order to induce the recording in a memory compartment, of the information present in the store RE1.

The memories which operate generally in the same way as the memory M1 can be of two types. In the first type the information extracted from a compartment is blotted away in the compartment from which it has been extracted. In the second type, the information which is read in a compartment of the memory remains recorded in its compartment and may be read therein several times in succession. As it is well known, the memories making use of magnetic core matrices are such that normally, the reading of the information contained in a compartment induces its blotting away and when it is required to maintain this information recorded in the compartment it must be re-recorded therein immediately. One understands thus, as it is well known in the art, that the difference between these two types of memories results from the recording and reading circuit such as EL1, which will either or not be designed in such a way as to re-record in a compartment what has just been read therein. The memory M1 belongs to the first type, whereas the memories M2 and M3, FIG. 2, and M5, FIG. 13, belong to the second type. Anyway, the type of memory used has no importance for the setting into use of the invention, the choice of a particular type of memory depends upon technological considerations which are beyond the field of the present invention. It will clearly appear to the man of the art that use may be made per example instead of the magnetic memories shown, circulation memories making use of delay networks.

FIG. 2 shows circuit EE1 associated with the incoming junction E1 which is the first multiplex junction of a group of 10. As it has been indicated the signals transmitted over this junction appear under a coded form. It will be assumed, in order to express it typically, that each element of transmitted signal during a time position, consists of five binary figures. On the other hand, the transmission being made in parallel, the incoming junctions and the outgoing junctions comprise each five conductors. The signals appearing on the 20 channels of this incoming junction are distributed, after having been delayed as the case may be, as it will be explained further on, on the outgoing junctions S1, S2 . . . S10. As it has been explained each repetition period of the transmission system over the junction E1 comprises 20 time intervals of 5 microseconds each, which are respectively assigned to the twenty incoming channels on this junction.

Each time position of 5 microseconds constitutes a time unit for the operation of the system, and is divided into four elementary equal time intervals of 1.25 microseconds respectively $t_1$, $t_2$, $t_3$ and $t_4$. The transmission system over the junctions is provided in such a way as the information presents itself on the incoming channels at the instants $t_1$, whereas the information is transmitted over the outgoing channels at the instant $t_4$. From the point of view of the operation of the memory $M_1$, the four elementary time intervals $t_1$ are used in the following way: the time interval $t_1$ is used for recording in the register RE1 the information which appears at this time position on the incoming channel: the time interval $t_2$ is used for recording in one compartment of the memory the information contained in the store RE1: the time interval $t_3$ is used for inducing through the circuit EL1 the reading of the contents of one memory compartment and the transfer of the information thus extracted to the store RL1, and the time interval $t_4$ is used for transmitting the information recorded in the store RL1 to the outgoing junction. As it has been explained hereabove, the choice of the compartment in which the reading or the recording is to be carried out is made by applying to the circuit SW1 the code corresponding to this compartment, next to which the circuit SW1 applies a suitable signal in order to induce the reading or the recording. On the other hand each compartment is assigned to a time position which corresponds to an incoming channel on the incoming junction E1. The circuit GP2 is provided in such a way as to operate in synchronism with the transmission system over the incoming junctions and at each time position at the instant $t_2$ it applies to the terminal CO2 the code corresponding to the incoming channel associated to the preceding time position, in the repetition period. The circuit GP may be common to all the incoming junctions and the code CO2 may be applied in parallel to the circuits SW1 of all the incoming junctions. One understands for example that at the instant $t_1$ of the time position No. 4 the signals appearing on the incoming channel No. 4 are recorded in the register RE1 and that at the instant $t_2$ the circuit GP applies to the terminal CO2 the code corresponding to the terminal 4 in order to induce the recording of the contents of the store RE1 in the compartment corresponding to this channel. In other words the recording of the signals appearing on the incoming channels is carried out in synchronism with the operation of the transmission system over the incoming junction. It will be explained later on, the reasons why the reading is carried out in an asynchronous way; however, it can be defined more accurately right now, that at the instant $t_3$ the code of the compartment which has to be read is applied by the conductor *ab*1 to the circuit SW1 which thus marks the compartment, the content of which has to be extracted, this content being then transferred to the store RL, and this through the circuit EL1 which receives for this purpose a signal at the instant $t_3$.

The memories M2 and M3 are generally identical to the memory M1 except that the information is registered therein in a semi-permanent way. On the other hand, these two memories are controlled from the point of view of the choice of the components, simultaneously by the same circuit SW2. It must be understood however that provision could have been made for a control circuit such as SW2 for each one of the memories. On the other hand, the operation of this memory is always synchronous, for example, the circuit GP applies at each time position to the terminal CO1 a code identical to the one applied at the instant $t_2$, to be terminal CO2 of the circuit SW1. However, this code is applied during the time interval $t_1$.

Each group of two corresponding compartments of the memories M2 and M3, for example, the two compartments controlled simultaneously by the circuit SW2 is assigned to a time position over an outgoing junction.

It will be described further on, in relation with the FIGURES 3 to 5 the means used for determining the information which is registered in these two memories. For the time being it will be sufficient to state that in two corresponding compartments of the memories M2 and M3, the code of the outgoing junction through which the communication must be set up at the time position corresponding to these two compartments is recorded in the compartment of the memory M2, and the code of the incoming channel with which the communication must be set up is recorded in the compartment of the memory M3.

In the continuation of the description, *s.y*

$$(y=1, 2, \ldots 20)$$

will designate the time positions on the outgoing junctions S*n* ($n=1, 2 \ldots 10$). For example, the channel 14 on the outgoing junction No. 2 will be written S2–*s*14. In the same way, the time positions on the incoming junction E*m* ($m=1 \ldots 10$) will be designated by *e.x*

$$(x=1 \ldots 20)$$

It can be understood that the incoming and outgoing junctions operate in synchronism and that the time positions *s*.2 and *e*.2 are identical, however, it is better, in order to simplify the description, to designate them in different ways.

In order to show the operation of the circuit, it will be assumed that the channel E1–*e*4 has to be connected to the channel S2–*s*14. Therefore, in the corresponding compartments No. 14 of the memories M2 and M3, are recorded respectively the code of the outgoing junction S2 and the code of the incoming channel *e*.4. In the course of one repetition period at the instant $t_1$ of the time position 4, the coded signal appearing over the junction E1 is recorded in the register RE1, at the instant $t_2$ of this same time position the contents of the store RE1 is transferred to the compartment No. 4 of the memory M1 and the store RE1 is released. At the instant $t_1$ of the time position 14, the codes of the calling incoming channel and desired outgoing channel are both extracted from the compartments of the memories M2 and M3 corresponding to the instant 14 and this information is transferred respectively to the reading stores RL2 and RL3 associated to the memories M2 and M3. At the instant $t_3$ of the time position 14 of the same repetition period, the contents of the reading stores RL2 and RL3 is extracted. The code of the outgoing junction (which comprises four digits in the case of 10 outgoing junctions when using the binary code) is applied to the decoder SW3 which in response, prepares the marking of one of the outgoing conductors *ca*1–*ca*10 (*ca*2 in the case under consideration) and therefore controls the opening of the associated electronic gate *p*1–2. The circuit SW3 is provided with a memory which has not been shown and which keeps the information recorded therein up to the time it is read. The circuit SW3 receives also at each time position a signal at the instant $t_4$, and it is provided in such a way as to control the opening of the electronic gate *p*1–1 . . . *p*1–10 during the instant $t_4$. In the same way, at the instant $t_3$ the code of the incoming channel extracted from the reading store RL3 is applied by the conductor *ab*1 to the circuit SW1 of the memory M1, in order to transfer in the store RL1 the contents of the compartment corresponding to the incoming channel. At the instant $t_4$ the contents of the store RL1 is applied in parallel to the electronic gates *p*1–1, *p*1–10 and is therefore transmitted on the channel S2 the electronic gate of which *p*1–2 is opened by the output signal of the decoder SW3. The circuit is then ready to deal with another communication at the following time position.

The operation of the control circuit (FIGS. 3, 4 and 5) during the setting up of a communication, i.e. the successive processes ending on the inscription in the memories M1, M2, M3, FIG. 2, of the information required for the operation of the switching circuit, will now be explained. It will be assumed that the circuit shown as CCO, FIG. 5, is in possession of the information on the incoming calling channel (E*m*–*ey*) and that on the other hand, it knows the outgoing junction (S*n*) through which this communication must be set up. As soon as the control circuit (FIGS. 3, 4, 5 and 14) is contacted by the circuit CCO in order to set up a communication, the circuit CCO induces the inscription in the registers RJE, RTE, RJS respectively of the codes E*m*–*ey* and S*n*. The operation of the circuit shown on FIGS. 3, 4, 5 and 14 has been divided into four stages, T1, T2, T3, T4 plus a rest position RE. It will be assumed that at the moment of the inscription of the information in the three registers, the circuit is at rest, in the position RE. It will be assumed also that the registers RJE, RTE and RJS are provided in a usual way, for furnishing a permanent signal as soon as an information has been recorded therein. The three signals thus obtained are applied to the coincidence electronic gate PE1, FIG. 5, which controls at its turn the electronic gate PS1 which receives from another end the synchronisation signals S*y* of the whole system. The signals S*y* are supplied for example by the impulse generator GP, FIG. 2. It is assumed that a synchronisation signal appears at the instant $t_1$ of the first time position of a group of 20, i.e. each 100 microseconds, FIG. 17. The circuit CET, FIG. 5, is a seven position counter and is as indicated hereabove, in the rest position at this stage of the operation. It will be noted that the stage T3 has been divided, in order to facilitate the explanation, in three stages T31, T32, T33. As soon as an output signal is obtained from the gate PS1, the counter CET shifts to position 1.

The control circuit (FIGS. 3, 4 and 5) has access, on the one hand to all the incoming junctions and to the circuits associated thereto, and on the other hand to all the outgoing junctions or more specifically in the example under consideration, to all the control conductors of the electronic gates allowing access to the outgoing junctions. In the position T1 of the counter CET (FIG. 5), the electronic gate PA1, FIG. 3, is open, so that the code S*n* of the outgoing junction is applied by the conductor 1, FIGS. 5, 4 and 3, to the decoding circuit SW4, which in response supplies a signal on one of its ten outgoing conductors. A bundle 2 is shown between the FIGS. 2 and 3 comprising ten conductors between on the one hand the control conductors *ca*1 . . . *ca*10 of the electronic gates *p*1–1 . . . *p*1–10 (FIG. 2) and on the outer hand, the ten electronic gates *pe*1 to *pe*10 (FIG. 3) the outputs of which are connected in parallel and are controlled respectively by the 10 outputs of the decoding circuit SW4. One understands that when a code S*n* is applied to the decoding circuit SW4 an output signal is obtained which opens the electronic gate *pe*1–*pe*10 corresponding to this code, and therefore to the outgoing junction S*n*, so that a signal is obtained at the output of the electronic gates at each time position at which the incoming junction E1 is in communication with the outgoing junction S*n*. The multipling arrows bearing the numeral 10 and shown on the outgoing conductors of the decoding circuit SW4 and on the common output conductor of the electronic gates *pe*1–*pe*10 indicate that a similar group of electronic gates is provided for each incoming junction, the ten gates such as *pe*9 being controlled in parallel by an outgoing conductor of SW4. A signal will thus be obtained at the input of circuit IV at each time position at which the outgoing junction S*n*, the code of which is applied to the circuit SWA, is engaged. The circuit IV supplies an output signal for each time position free on the junction S*n*, for example, each time it does not receive impulses. These signals pass through the electronic gate PB1 normally open in position 1 and control the electronic gate PC1 which receives from another end, the codes of the time position supplied by the central generator GP, FIG. 2. One understands that these codes may be constituted by the serial number of each time position beginning from the synchronisation position, the aforesaid serial number being expressed for example in a binary code. The first output signal of the circuit IV induces thus the inscription in the register RC1 of the code of the first time position which is free on the outgoing junction S*n*. The register RC1 is provided in such a way as to supply a continuous output signal as soon as a code has been recorded therein and this signal is applied to the electronic gate PB1, in order to block it whatever the signals applied to its other inputs may be. The circuit as described hereabove, operates thus, in order to record the code of the first time position which is free on the called outgoing junction S*n*. The output signal of the register RC1 is also applied as blocking signal to the electronic gate PD1 which controls one of the inputs of a rocking circuit BA1. This rocking circuit receives on its other input a return to rest signal at the end of the operation of the circuit. If all the time positions are occupied on the outgoing junction S*n*, the register RC1, does not apply a blocking signal and the synchronisation signal which indicates the beginning of the following period induces through the electronic gate PD1, the shifting of the circuit BA1 to its second stable state, this indicating that the communication cannot be set up. In this case, a signal OC is transmitted by the circuit BA1 to the circuit CCO (FIG. 5) in order to induce the release of the control circuit. If a time position is free on the outgoing junction S*n*, the gate PD1 is blocked and the operation of the circuit proceeds normally. The code of the free time position on the called outgoing junction which is registered in the store RC1 is applied to a comparison circuit COM1 which receives from elsewhere the codes CO of the 20 time positions. The comparator COM1 is provided for supplying on its outgoing conductor 3 (FIGS. 3 and 4) a signal at a free time position on the called outgoing junction S*n*, and this at each repetition period of operation of the system.

It has been explained in relation with FIG. 2 that the memory M3 was used for recording the codes of the time positions *s.x* to which communication are set up from the incoming junction E1. These codes appear on the five conductors *ab*1, FIG. 2, and are applied by the conductors 6 (FIGS. 2 and 3) to the input of the electronic gates PG1. The code of the incoming junction E1 from which the communication must be set up is applied from the register RJE by means of the conductor 7 (FIGS. 5, 4 and 3) and the electronic gate PH1 (FIG. 3) open in position T1, to a decoding circuit SW5 which operates in the same way as the circuit SW4 and supplied a signal on the outgoing conductor corresponding to the code of the junction E1. Each conductor controls two electronic gates PK1 and PG1 (which are multiple in the case considered). Through the electronic gate PG1, the codes *s.x* which indicate the time position, or in other words the incoming channels of the junctions E1 which are in communication with the outgoing junctions are applied to the circuit IR designed for supplying an output signal, each time it does not receive a code at its input, i.e. for each time position *s.x* to which the incoming junction E1 is not in communication. The arrangement comprising the electronic gate PI1, the electronic gate PJ1, the register RD1 and the code comparator COM2, operates in the same way as the electronic gate PB1, the electronic gate PC1, the store RC1 and the code comparator COM1. It is understood that the code *s.x* of a time position on the outgoing junctions with which the incoming junction is not in communication, or in other words, a time code position which is not recorded in the memory M3 is recorded in the memory RD1 and the comparator circuit supplies at each repetition period a corresponding signal on the conductor 4 (FIGS. 3 and 4). As it has been explained, the registers RC1 and RD1 supply an output signal as soon as a code has been recorded. These signals are applied to the electronic gate PF1 which applies, through the conductor 8 (FIGS. 3, 4 and 5) a signal to the counter CET which shifts to the position T2. At this stage of the operation, the following elements are available at each repetition period:

On the conductor 3, at each repetition period of the system, a one position signal in time corresponding to one free channel on the outgoing junction through which the communication must be set up.

On the conductor 4, at each repetition period of the system, a one position signal in time to which no outgoing junction is in communication with the calling incoming junction.

In the continuation of the description, S*a* and S*b* will designate the time positions at which appear the signals respectively on the conductors 3 and 4.

As it has been explained hereabove, each time position such as S*a* and S*b* is divided into four elementary times having each one a duration of 1.25 microseconds. The impulses of 5 microseconds S*a* and S*b* are applied respectively by the conductors 3 and 4 (FIGS. 3 and 4) to the generators SAG and SBG, FIG. 4. Each one of these generators such as SAG supplies in response to the reception of an impulse such as *sa*, four successive impulses of 1.25 microseconds *sa*1, *sa*2, *sa*3 and *sa*4, respectively on the four outputs.

The operation of the control circuit in position T2 will now be explained. As soon as the counter CET shifts to the position T2, the electronic gate PM1 (FIG. 4) is opened. Therefore at each instant S*b*1, an impulse is applied from the conductor 4 through the gate PM1 to the counter CE1, FIG. 4, which has been replaced to a rest position by a signal RE supplied by the counter CET, FIG. 5, at the end of the operation cycle. The counter CE1, FIG. 4, comprises as many positions as there are incoming junctions plus one namely 11 positions in the example under consideration. It is provided in such a way as to apply on the one hand, on its outputs the code of the recorded total and on the other hand to apply on the conductor 9, FIGS. 4 and 5, a signal when it arrives to position 11. At each counting position of the counter CE1, the code of an incoming junction is applied, on the one hand to the register R31 of the memory M4 through the electronic gate PS1, and on the other hand through the electronic gate PQ1 (open at the instants S*a*2/S*b*2 through the mixer electronic gate PR1) and the conductor 10, FIGS. 4 and 3, to the decoding circuit SW5 the operation of which has already been explained and which therefore opens at the instants *sa*2 and *sb*2 the electronic gates PK1 and PG1.

Before going on in the explanation of the operation of the circuit the components of the memory M4, FIG. 4, will be explained rapidly. One has considered the case of a memory M4 of the same type as the memories M1, M2 and M3, FIG. 2, which consists of as many compartments as there are outgoing junctions, 10 per example, in the case considered. The choice of the compartment in which the recording is carried out, i.e. of the horizontal line in the example shown, is carried out through the decoding circuit SW6 to which is applied, as it will be explained further on, the code of an outgoing junction, and which, in response, marks the corresponding conductor, either for carrying out a recording, or for carrying out a reading. Furthermore, it will be assumed that the decoding circuit SW6 comprises a memory, i.e. after reception of the code it induces the marking of a horizontal line and maintains this marking up to the moment where another information is applied to it. Each compartment is divided into four sections which have been designated by SE31, SE32, SE33 and SE34, these sections being associated respectively to the recording and reading registers R31, R32, R33 and R34. As it will be explained further on, the information registered in these registers, is recorded at different instants. During an elementary cycle of operation of the circuit of FIG. 4, comprising 20 time positions, two inscriptions are carried out respectively in the stores R31 and R32 at the instant *sb*2, and in the registers R33 and R34 at the instant *sa*2. The operation of the circuit at the moment where an impulse is applied at the instant *sb*1 to the counter CE1 which is in a position corresponding to the code of the incoming junction E*n*–1, will be reconsidered. The counter CE1 shifts then to the position corresponding to the code of the junction E*n*. This code is applied, on the one hand as it has been already indicated to the decoding circuit SW5, FIG. 3, in order to induce the opening of the electronic gates PK1 and PG1 allowing access to this incoming junction, and on the other hand through the electronic gate PS1, FIG. 4, opened in the position *sb*3, to the register R31 where this code is then recorded. The electronic gate PK1 (FIG. 3) connects, by means of the conductor 18 (FIGS. 2, 3 and 4) and of the electronic gate PT1, FIG. 4, opened at the instant *sb*, the output of the reading store RL2 (FIG. 2) of the memory M2 associated to the junction E*n*, the code of which is recorded in the counter CE1, FIG. 4, at the input of the decoding circuit SW6, FIG. 4. The signals appearing at this instant at the outputs *da*1 to *da*4 of the reading store RL2 of the memory M2, FIG. 2, correspond to the code of the outgoing junction S*m*, which at the instant *sb* is set into communication with the circuit of the incoming junction E*n*. This code applied to the circuit SW6, FIG. 4, is used for marking the horizontal conductor, for example, the compartment in which the further recordings will be carried out, during this elementary cycle of operation (100 microseconds). The electronic gate PG1 (FIG. 3) puts in communication the outputs *db*1 to *db*5 of the reading store RL3 of the memory M3, FIG. 2, of the circuit associated to the incoming junction E*n* ($n=1$ in the case of FIG. 2), FIG. 2, with the register R32 of the memory M4, FIG. 4, and this through the conductor 6, FIGS. 2, 3 and 4, and the electronic gate PU1, opened at the instant *sb*3. The code which appears at the output of the reading register RL3 of the memory M3, FIG. 2, is that of the incoming channel on the junction E*n*, or even of the time position *e.x* at which the communication dispatched on the outgoing junction S*m* at the instant *sb* presents itself on the incoming junction E*n*. This code is recorded in the register R32. The information recorded in the registers R31 and R32 will be registered in the sections of the compartment M4 corresponding to the code applied to the circuit SW6 by applying at the instant *sb*3 a signal to the registers R31 and R32 as well as to the circuit SW6. At the instant *sa*3, the electronic gate PQ1 is opened once again through the gate PR1, FIG. 4, and the code of the incoming junction E*n*, is again applied through the conductor 10 to the decoding circuit SW5, FIG. 3. The code of the outgoing junction which appears on the conductor 18, FIGS. 2, 3 and 4, is applied at this instant through the electronic gate PV1 opened in position *sa*2, to the store R33, whereas, through the conductor 6, FIGS. 2, 3 and 4, and the electronic gate PX1, FIG. 4, opened at the instant *sa*3, the code of the time position, at which the communication, set up with the outgoing junction the code of which is recorded in the register R33 at the instant *sa*3 presents itself on the junction E*n*, is applied to the register R34, FIG. 4. The registering in the memory of the information contained in the registers R31, R32, R33 and R34 at the end of the time interval *sa*, by applying at the instant *sa*3 a signal to the registers R31 to R34 as well as to the circuit SW6.

The circuits R31 to R34 are then released and are ready to be used at the next elementary cycle of operation. During the appearance of the following impulse *sb*1, the counter CE1 shifts to the position corresponding to the code of the junction E$m$+1 and the operations described resume. It is to be noted that when the circuit of the incoming junction, the code of which is recorded in the counter CE1 is not put into communication with anyone of the outgoing junction at the instant *sb*, the code 0 is applied to the circuit SW6 and therefore no recording is carried out in the memory, the circuit SW6 being designed in such a way as not to mark any of the horizontal conductor, when the code 0 is applied to it. The process described in relation with the junction E*n* is successively repeated for the 10 junctions, and when the code recorded in the counter CE1, FIG. 4, corresponds to 11, a signal is applied, as it has been indicated by the conductor 9, FIGS. 4 and 5, to the counter CET which shifts to the position T31.

A table showing an example of the information in the way it is recorded in the memory M4 at the end of the operation stage T2, is shown on FIG. 6. The column 1 shows the different outgoing junctions which may be classified according to any order whatsoever but which have been classified according to the increasing numerical order for reasons of simplification. On a same line, the column 3 indicates the channel on the incoming junction (column 2) which is in communication at the instant *sb* with the outgoing junction indicated column 1. In the same manner, the column 5 indicates the incoming channel on the incoming junction (column 2) which is in communication at the instant *sa* with the outgoing junction indicated column 4.

FIG. 7 shows an abstract of the information contained in the table of FIG. 6 shown under another form. Each column comprises successively from left to right the code of an incoming junction, the code of the outgoing junction with which it communicates at the instant *sb* and the code of the outgoing junction with which it is into communication at the instant *sa*.

One will refer in the continuation of the description to the table of FIG. 7. The switchings carried out on the incoming channels will be explained without referring to the complete table of FIG. 6. The table of FIG. 7 which shows the communication in course of operation comprises in each column, at the maximum once, each one of the junctions. This condition is necessary for, if the same junction S4 for example should appear twice, line 2 and line 8 for example in the same column *sb*, one would be led to open simultaneously the electronic gates *p*2–4 and *p*8–4 (FIG. 1 or 2) at the instant *sb*. On the other hand, if the communications are normally in course of operation this condition is necessarily fulfilled as it will appear from the reading of the continued description. It is to be noted that the code of the incoming calling junction does not appear on FIG. 6 in the second column from the left, and that the code of the outgoing junction through which the communication must be set up does not appear in the fourth column from the left. In the same way, it exists a line which does not comprise any recording, namely that corresponding to the incoming calling junction. The fact that this line does not comprise any recording does not mean that the incoming calling junction is not in communication at the time position *sa*, however, this fact is not recorded. One understands also that there is a free compartment in the fourth column from the left, namely that corresponding to the outgoing junction requested. It may occur that this free compartment is that corresponding to the calling incoming junction on which no information is recorded. It will be understood from the continued description that this particular case is dealt with in the same way as the general case.

In the continued description the tables derived from that of FIG. 7 and shown in FIGS. 8 to 12, will have to be considered not like an abstract of the contents of the memory M4, FIG. 4, but rather like a state of the connections set up at the instants *sa* and *sb*, the modifications brought to the connections and appearing in the tables derived from that of FIG. 7, not being recorded in the memory M4, FIG. 4.

The operation leading to the laying up of the requested communication among the communications already set up will now be described. As it has been explained hereabove the code of the incoming junction and the code of the calling channel on the incoming junction and the code of the outgoing junction through which the communication must be dispatched are recorded respectively in the registers RJE, RTE and RJS, FIG. 5. On the other hand, as it has been indicated in relation with the operation of the circuit of FIG. 4, as soon as the information on the existing communications at the time positions *sa* and *sb* are recorded in the memory M4, FIG. 4, the counting circuit CE1, FIG. 4, transmits at the instant *sb*1 a signal to the counter CET, FIG. 5, in order to shift it from the position T2 to the position T31 which is a waiting position during which no modification is carried out in the circuit. From the point of view of the operation of the circuit which leads to the laying up of the requested communication among the communications already set up, three stages of operation has been considered, viz: T31 which is a waiting position, T32 and T33. In order to make easy the explanation, a particular example will be referred to, viz the setting up of a communication between the channel *e*4, E1 and the outgoing channel S2:

Recording of the code of the incoming channel and of code of the outgoing junction, through which the communication must be dispatched, in the compartments corresponding to the time position *sb* of the memories M2 and M3 (FIG. 2) of the circuit associated to the incoming calling junction (these compartments are free owing to the choice of *sb*).

Figure 5:
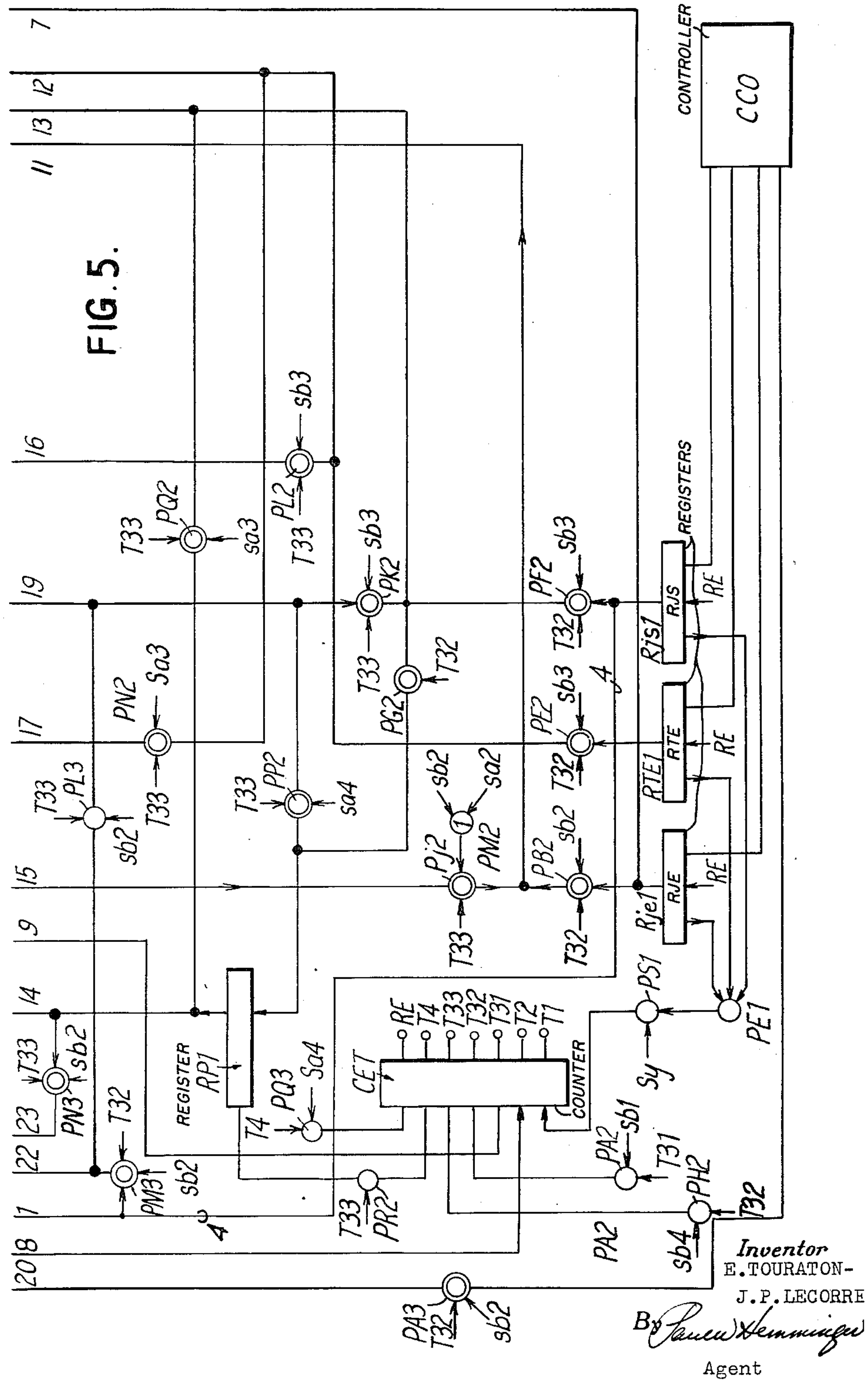

The impulse *sb*1 which follows immediately the shifting of the counter CET1, FIG. 5, to the position T31 induces through the gate PA2, FIG. 5, the shifting of the counter CET to the position T32. The code of the calling incoming junction (E1) contained in the register RJE, FIG. 5, is then applied at the instant *sb*2, through the electronic gate PB2 and the conductor 11, FIGS. 5, 4 and 3, to the decoding circuit SW7, FIG. 3, identical to the circuit SW5, FIG. 3, which opens the two electronic gates PC2 and PD2 FIG. 3, allowing access to the calling incoming junction, the code of which is recorded in the register RJE, FIG. 5. It will be assumed that the decoding circuits SW5 and SW7 comprise a memory, not shown, and that they remain in the position corresponding to the code applied to them as long as a new code is not applied thereto. At the instant *sb*3, the code of the incoming channel *e*.4 on the calling incoming junction E1, registered in the register RTE, FIG. 5, is applied through the electronic gate PE2, the conductor 12, FIGS. 5, 4 and 3, the electronic gate PD2 and the conductor 12, FIGS. 3 and 2, to the recording register RE3 of the memory M3. From the explanation given in relation with FIG. 2, one understands that the information on the incoming channel is recorded at the instant $t_3$ in the register RE3 and that it is transferred to the compartment of the memory M3 corresponding to the instant *sb*, at the instant $t_4$ a signal $t_4$ being applied to the circuit EL3 for this purpose. During this same time interval *sb*3 (which corresponds as it has been just shown to the instant $t_3$ of the time position *sb*, from the point of view of the operation of the memories of FIG. 2) the code of the outgoing junction S2 (registered in the register RJS, FIG. 5) is applied through the electronic gate PF2, the conductor 13, FIGS. 5, 4 and 3, the electronic gate PC2, the conductor 13, FIGS. 3 and 2, to the recording register RE2 of the memory M2, FIG. 2. As in the case of the operation of the memory M3, the code of the outgoing junction S2 requested is transferred from the register RE2 to the compartment of the memory M2 corresponding to the instant *sb* during the instant $t_4$ of the time interval *sb*. On the other hand, the code of the outgoing junction contained in the register RJS, FIG. 5, applied through the electronic gates PF2 and PG2, FIG. 5, to a provisional register RP1 (FIG. 5) where it is recorded and from where it is applied by the conductor 14, FIGS. 5 and 4, to the input of the decoding circuit SW6, FIG. 4, which as already explained, comprises a memory where this code is recorded, selecting the compartment of the memory M4 corresponding to the code of the outgoing junction requested. During the same elementary operation cycle, the impulse *sb*4 induces, through the electronic gate PH2, FIG. 5, the shifting of the counter CET, FIG. 5, to the position T33. The state of the connections at the instants *sa* and *sb* is shown in the table of FIG. 8 where the modifications are indicated in thick lines. It is observed that S2 appears twice in the central column (*sb*). The purpose of the following operation is to cancel this state of things.

First operation cycle of the stage T33 during which the times at which the connections between the incoming junction E8 and the outgoing junctions S2 and S1, are inverted.

During the following operation cycle at the instant *sb*1, the contents of the compartments of the memory M4, FIG. 4, corresponding to the outgoing junction requested (S2 in the example under consideration), is extracted from the memory M4 and transferred to the registers R31, R32, R33 and R34. It is assumed that the reading of this information in the compartments of the memory M4 blots away this information, thus releasing these compartments of the memory. The control signal is applied to the circuit SW6 through the electronic gate PR2, FIG. 4. At the instant *sb*2, the code of the incoming junction recorded in the compartment of the memory M4 section SE31 corresponding to the outgoing junction S2, namely E8 in the example shown in the table of FIG. 6, and which has been transferred at the instant *sb*1 to the register R31 is applied by the conductor 15, FIGS. 4 and 5, the electronic gate PJ2 (controlled by the electronic gate PM2 at the instant *sb*2) and the conductor 11 to the decoder SW7, FIG. 3, which opens the electronic gates PC2 and PD2 allowing access to the circuit of the incoming junction E8. At the instant *sb*3 the code of the outgoing junction S1 (registered in the register R33, FIG. 4) which is in communication at the instant *sa* with the incoming junction E8, is applied by the conductor 19 the electronic gate PK2, FIG. 5, and a circuit already described (conductor 13, FIGS. 5, 4, 3 and 2) to the recording register RE2 of the memory M2, FIG. 2. As it has been explained hereabove, the recording and reading circuit of the memories M2 and M3 is designed in a way as to re-record the information which has been just read, if no other contradicting order is transmitted, and in particular if nothing is registered during this operation cycle in the recording registers RE2 or RE3. Referring to the elementary operation cycle given in relation with FIG. 2, one understands that the information are extracted out of two corresponding compartments of the memories M2 and M3 at the instant $t_1$, and that they are re-recorded in this same compartment at the intant $t_4$ if no information has been recorded in the registers RE2 and RE3. If an information has been recorded (at the instant $t_3$) for example in the register RE2, the information just read is replaced by the information contained in the register RE2, at the moment of the re-recording at the instant $t_4$.

The memory M3 operates in a similar way. It is this process which is used in order to modify the information contained in the different compartments of the memory. One understands that, by applying to the register RE2 (FIG. 2) of the circuit associated to the incoming junction E8, and this through the electronic gate PK2, FIG. 5, the code of the outgoing junction S1 which is normally in communication at the instant *sa* with the incoming junction E8, the code of the junction S2 which is recorded is replaced in the compartment of the memory M2 (FIG. 2) corresponding to the time position *sb* on the outgoing junction, by the code of the junction S1. In the same way, at the instant *sb*3, through the conductors 16, FIGS. 4 and 5, the electronic gate PL2 (FIG. 5) the conductors 12, FIGS. 5, 4 and 3, the electronic gate PD2 and the conductor 12, FIGS. 3 and 2, and code of the incoming channel *e*11 is applied to the register RE3, FIG. 2, of the memory M3 associated to the incoming junction circuit E8. Referring to the table of FIG. 8, one understands that the incoming channel *e*11 of the junction E8 is the one which was up to that moment in communiction with the outgoing junction S1 at the instant *sa*. The inscription in the register RE3, FIG. 2, of the incoming channel (*e*11) code induces in the compartment of the memory M3, corresponding to the instant *sb*, the replacement of this incoming channel code *e*5 which was recorded by that of the incoming channel *e*11.

Figure 3:
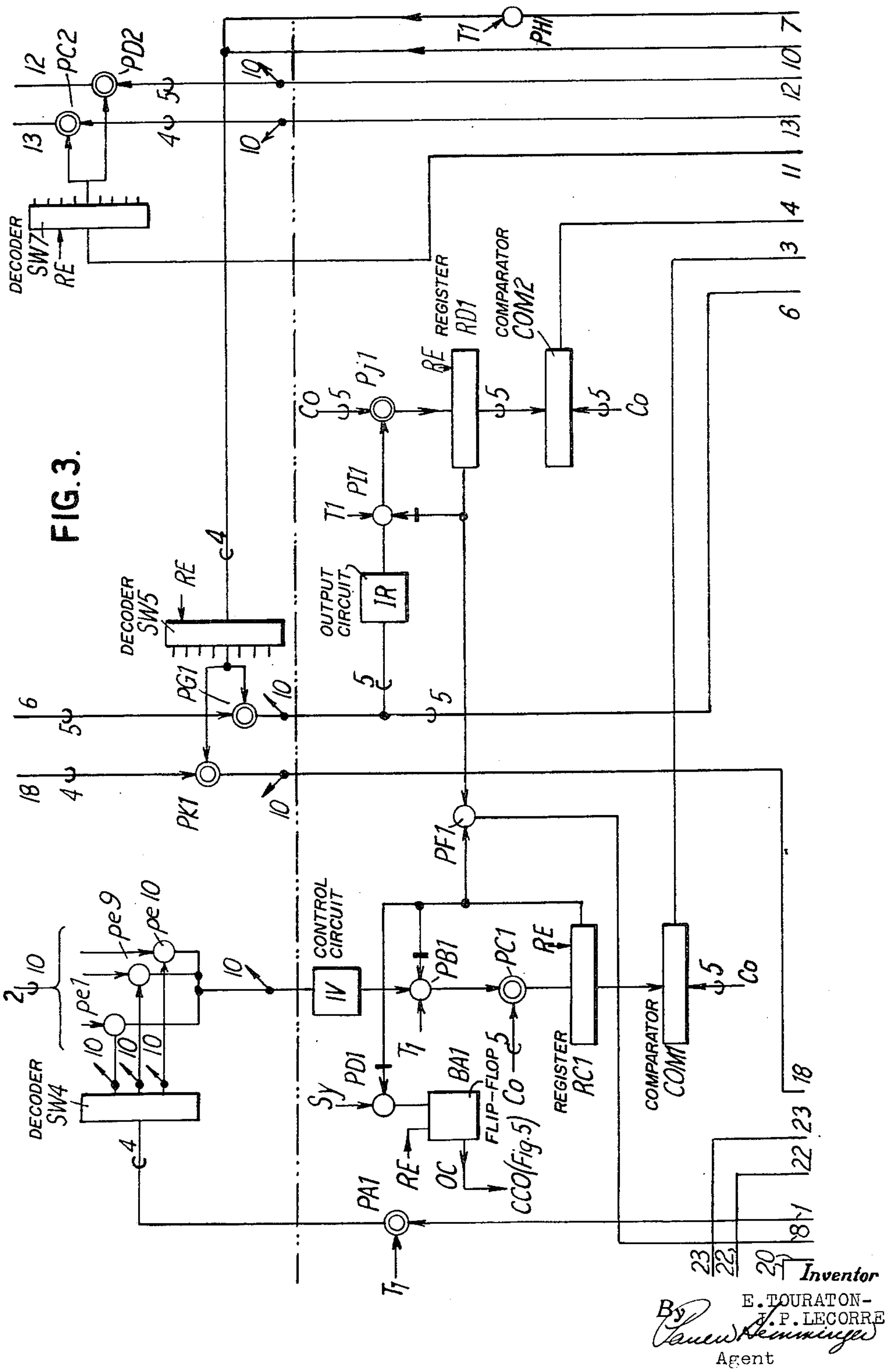

At the following instant *sa*2, a signal is applied through the electronic gate PM2, FIG. 5, to the electronic gate PJ2 in order to apply once again to the decoding circuit SW7, FIG. 3, the code of the incoming junction E8 recorded in the section SE31 of the compartment of the memory M4 corresponding to the outgoing junction S2. The circuit shown on the FIGS. 4 and 5, is thus again linked to the circuit associated to the incoming junction E8. At the instant S*a*3, the code of the incoming channel *e*5 of the incoming junction E8 which was up to that moment in communication at the instant *sb* with the outgoing junction S2, and which was recorded in the section SE32 of the compartment of the memory M4 corresponding to the outgoing junction S2 is applied by the conductor 17, FIGS. 4 and 5, the electronic gate PN2 and a circuit already described to the register RE3 of the memory M3 (FIG. 2) associated to the incoming junction E8. One understands that this code replaces then at the instant $t_4$, the code *e*11 which was recorded in the compartment corresponding to the time position *sa*. In the same way, at the instant *sa*3 and through the electronic gate PQ2, FIG. 5, and a circuit already described, the code of the outgoing junction S2 contained in the register RP1 is applied to the register RE2 of the memory M2, FIG. 2. One understands that at the instant $t_4$ of the time position *sa*, the outgoing junction S2 code replaces in the compartment of the memory M2 corresponding to the instant S*a*, the code of the outgoing junction S1 which was recorded.

Before the first cycle of the operation in T33 the communications in course of operation, were the following (FIGS. 6 and 7):

At the time position *sb*: E8–*e*5 in communication with S2–*sb*.

At the time position *sa*: E8–*e*11 in communication with S1–*sa*.

After the switchings carried out at the instants *sb* and *sa* the communications set up at these time positions become:

At the time position *sb:* E8–*e*11 in communication with S1–*sb*.

At the time position *sa:* E8–*e*5 in communication with S2–*sa*.

The state of the programme of the switchings which are then to be carried out at the instants *sa* and *sb* is shown in the table of FIG. 9.

At the instant *sa*4 the electronic gate PP2, FIG. 5 is opened so that the code of the outgoing junction which was in communication at the instant *sa* with the incoming junction E8 (namely S1) is applied to the provisional register RP1 where it replaces the one previously recorded (S2) therein. One is therefore placed once again in the same conditions as those existing at the beginning of the first operation cycle in T33, which has just been explained in detail.

The operations described in relation with the first operation cycle, namely the way the formation contained in the compartment of the memory M4 corresponding to the outgoing junction S2 are dealt with, will now be repeated during the second operation cycle but applied to the information contained in the compartment corresponding to the outgoing junction S1.

The programme of the switchings which are to be carried out at the instants *sa* and *sb* is at the end of the second operation cycle the one shown on FIG. 10.

The following cycle (third) alters the part of the switching programme which is recorded in the compartment of the memory M4 corresponding to the outgoing junction S7. The state of this programme at the end of the third cycle is indicated in the table of FIG. 11.

The fourth operation cycle alters the part of the switching programme recorded in the compartment of the memory M4 corresponding to the outgoing junction S4. But the sections SE33 and SE34 of this compartment are empty this indicating that no switching is set up at the instant *sa*. At the instant *sa*4 the contents of the section SE33 of the compartment of memory M4 in course of reading is transferred to the provisional register RP1 through the electronic gate PP2 (FIG. 5) the code 0 is thus recorded in the register RP1 which is designed in order to supply in this case an output signal which is applied through the electronic gate PR2 to the counter CET (FIG. 5) which is then shifted to position T4. The counter CET remains in position T4 during 100 microseconds and at the instant SA4 the electronic gate PQ3 induces the shifting of the counter to the position RE at which the common control circuit is released, all the registers and the decoders being replaced in the rest position. The switching operations ending in the laying in position of a communication among the communications already set up, have been described in relation with the FIGS. 2 to 12. The description has been limited up to now to the switching circuit shown on FIG. 2, which inside a telephonic switching system may constitute for example, a group switch as it has been explained the circuit of FIG. 2 is associated to an incoming junction E1 and it has access to ten outgoing junctions S1 to S0. The switching circuit associated to the outgoing junction S2 has been shown in ES2, FIG. 13. The control circuit shown on FIGS. 3, 4, 5 and 14 has access on the one hand to the ten circuits of the incoming junctions EE1, EE10, such as the one shown on FIG. 3, and on the other hand to the ten circuits of the outgoing junctions ES1, ES10 such as the one shown in ES2, FIG. 13. The outgoing junction circuit ES2 comprises a memory M5 operating in the same way as the memory M2, FIG. 2, which in the example considered is assumed to make use for memory element, magnetic material stores with rectangular hysteresis cycle. As it has been explained in the case of memory M2, the memory M3 comprises 20 compartments each compartment consisting of stores arranged according to one same horizontal line. The choice of a compartment for the reading of the recording is carried out by means of a circuit SW10 which operates in the same way as the circuit SW2, FIG. 2. The store matrix is associated to a recording and reading circuit EL5, to a reading register RL5 and to a recording register RE5. Within a repetition period of 5 microseconds, the operation of the circuit is the following one: at the instant $t_1$, the contents of one compartment is read and the information contained therein is transferred in the reading register RL5, at the instant $t_3$, the information is extracted from the register RL5 in order to be sent to the decoding circuit SW11. At the same instant $t_3$ and at the instant $t_4$, the information contained in the register RE5 are transferred in the compartment of the memory chosen through the circuit SW10. The information transmitted at the instant $t_3$ to the register RE5 are also transmitted at the same instant to the reading register R15, where they replace those extracted from the memory M5, and from which they are applied to the decoder SW11, as in the case of the memories M2 and M3, it is assumed that when no information is available in the register RE5 the circuit EL5 operates in order to re-record at the instant $t_4$, in the compartment of the memory, the information extracted therefrom at the instant $t_1$. The information extracted from the register RL5 are applied to the decoding circuit SW11 which chooses one conductor among *m*. These *m* conductors (C1, *Cm*) are used for controlling the electronic gates allowing access, from the junction S1, to the outgoing circuit LA2–1 to LA 2–*m*. One understands that when a communication is to be set up, at a given time position, through the junction S2, with an outgoing circuit LA2–2, for example, one registers in the compartment of the memory M5 corresponding to the time position, the code corresponding to this outgoing circuit, or, in other words, the code of the conductor C2 through which the control of the electronic gate *pa*2–2 associated to the circuit LA2–2 is carried out. The circuit SW10 being controlled in the same way as the circuit SW2, FIG. 2, each time the corresponding compartment is scanned one induces the opening of the electronic gate *pa*2–2 (in the case considered) so that the outgoing circuit LA2–2 is put into communication with the junction S2. It is to be noted here that in fact the information actually appears on the junction S2 at the instant $t_4$, of each repetition period period of the system. Therefore, the decoding circuit SW11 has been provided with a memory, not shown, and it receives a control signal $t_4$, in order to open the electronic gate, such as *pa*2–2 at the instant $t_4$, at the moment where the information is transmitted on the junction S2. The circuit Sw11 may be designed according to a known way in order to keep the information recorded therein, until new information is transmitted to it.

During the explanation of the operation of the circuits shown on FIGS. 2 to 5 it has been indicated that in order to lay in position new communications among those already set up, one was led, according to the invention, to modify some of the communications already set up, or more accurately to modify the time positions at which they are set up.

However, one understands that the modifications brought to the circuit shown on FIG. 2 must also be carried out in the outgoing junction circuits such as ES2, in order to maintain the continuity of the communications in course. To simplify the explanation, no mention has been made of the modifications brought to the outgoing junction circuits but one must understand that they are carried out in synchronism with those brought to the circuit of FIG. 2. The operation of the circuit at the beginning of the operation stage T32 will be reconsidered.

Figure 14:
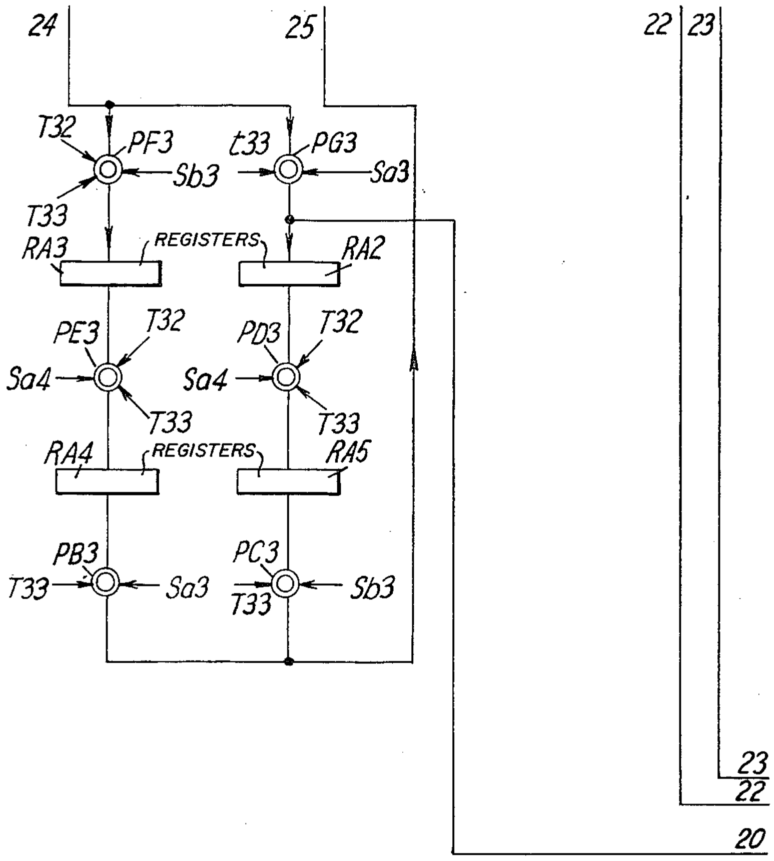

The common circuit CCO, FIG. 5, keeps not only the information on the incoming junction, the incoming channel and the outgoing channel through which the communication must be set up, but it knows also the code of the circuit toward which the communications must bet set up, for example LA2–2. At the instant *sb*2 of the stage T32 the code of the circuit LA2–2 is transmitted from the circuit CCO through the electronic gate PA3, FIG. 5, and the conductor 20, FIGS. 5, 4, 3 and 14 to the register RA2, FIG. 14, where it is recorded. In the same way, at the instant *sb*2 of T32, the code of the outgoing junction (S2) is transmitted from the register RJS, FIG. 5, through the electronic gate PM3 and the conductor 22, FIGS. 5, 4, 3, 14 and 13 to the decoding circuit SW8 which comprises a memory and operates in an identical way than the decoding circuit SW1, FIG. 2. This circuit controls the opening of the electronic gate PH3 which links the control circuit to the circuit ES2 associated to the outgoing junction S2 through which the communication is to be dispatched. One understands that there are as many electronic gates such as PH3 as there are outgoing junctions such as 10. As it has been explained hereabove the time position *sb* is a position at which no outgoing junction is in communication with the calling incoming junction (E1). However it may happen that at this instant, the outgoing junction through which the communication is to be set up, namely S1 in the example considered, is in communication with another incoming junction. Referring to the table of FIG. 6, it appears that in the example considered, it is the incoming channel E8–*e*5 which is in communication with the outgoing junction S2 at the instant S6. At the instant *sb*3 of the same operation cycle, the electronic gate PF3, FIG. 14, is open, so that the code of the circuit LA2–x which is in communication with the incoming-channel E8–*e*5 is recoded in the register RA3, FIG. 14. At the instant S*a*4 of the stage T32, the electronic gates PE3 and PD3 are opened in order to transfer the contents of the registers RA3 and RA2 respectively in the registers RA4 and R45. These four registers are of the same type as the register RP1, FIG. 5, i.e. that they keep the information transmitted to them as long as a new information is not applied thereon. The control circuit shifts afterwards, as it has been explained, to the position T33. At the instant *sb*2 of the first operation cycle within the stage T33, the electronic gate PN3 is open so that the code recorded in the register RP1 (namely the code of the outgoing junction S2 in the case considered) is applied by the conductor 23, FIGS. 5, 4, 3 and 14, to the decoding circuit SW9 in order to put the common control circuit into communication with the circuit of the outgoing junction S2, through the electronic gate PJ3. At the same instant *sb*2 the electronic gate PL3 is opened in order to apply through the conductor 22 the code recorded in the register R33, FIG. 4, to the decoding circuit SW8. This code is that of the outgoing junction S1 as it may be seen by referring to the tables of FIGS. 6 or 7. The decoding circuit SW8 controls an electronic gate PH3 (FIG. 13) in order to put the control circuit into communication with the circuit ES1 of the outgoing junction S1. At the instant *sb*3 the code of the outgoing circuit which is in communication with the junction S1 is recorded through the electronic gate PF3, FIG. 14, in the register RA3. In the same way, at the instant *sb*3 the code of the requested circuit LA2–2 which is recorded in the register RA5 is transferred at the instant *sb*4 to the compartment of the memory M5 corresponding to the instant *sb*. The code transmitted at the instant *sb*3 to the register RE5 is also transmitted to the register RL5 where it takes the place of the one extracted from the memory M5, and from which it is applied to the decoding circuit SW11.

At the instant *sa*3 the electronic gate PG3 is open so that the code of the outgoing circuit which is in communication at the instant *sa* with the outgoing junction S1 is recorded in the register RA2. At the same moment *sa*3 the code of the outgoing circuit LA2–*x* which was in communication with the outgoing junction S2 at the instant *sb* is transferred to the registers RE5 and RL5 through the electronic gates PB3 and PJ3 (FIGS. 14 and 13). This code applied in *sa*3 to the decoder SW11, will be transferred to the compartment corresponding to the memory M5 at the instant *sa*4. At the same instant *sa*4 the codes contained in the registers RA2 and RA3 are respectively transferred to the registers RA5 and RA4 through the electronic gates PD3 and PE3. During the following cycle, the code contained in the register RA5, will be transferred at the instant $sb3$, in the register RE5 of the memory M5 associated to the circuit of the outgoing junction ES1. In the same way at the instant $sa3$ the code contained in the register RA4 will be transferred to the register RE5 of the memory M5 of the circuit SE1.

These operation cycles repeat themselves, and FIG. 15 shows the connections as they are set up after the modifications brought by the control circuit to the memories M2 and M3, FIG. 2, and M5, FIG. 13. When reading the table of FIG. 15, one observes that at certain moments two incoming channels belonging to different incoming junctions are connected to a same channel of an outgoing junction. This may appear as a disadvantage. However, it must be understood that this phenomenon has an influence on only a limited number of channels during the setting up of a new communication and that the disturbance practically lasts only approximately one repetition period every 4 seconds, for example, approximately one impulse every 250,000 impulses. The disturbance has thus the character of a noise and in the case of transmission of a speech signal this disturbance is not distinguishable. The table of FIG. 16 shows the programme of the switchings at the end of the operations ending in the production of a new communication. It is presented in the same manner as the table of FIG. 6.

The invention has been described in relation with a particular example in which the case of one single switching stage with 10 incoming junctions and 10 outgoing junctions has been considered. Such an arrangement may obviously be applied, with the provision of some modifications which are obvious to the man of the art, to a switching stage involving either a concentration or an expansion, i.e. in which the number of incoming junctions is different from that of the outgoing junctions. In the same way, the invention may be applied to the case of several switching stages, the common circuit controls then successively in the different switching stages the operations leading to the laying in position of a communication. In order to simplify the description one has considered the case in which the transmission of the information on the junctions is done in one direction only. However, it must be understood that the system may with the provision of modifications obvious to the man of the art, operate in the two directions. For example, it is merely sufficient to make provision for a second network of electronic gates linking the incoming junctions to the outgoing junctions controlled in parallel and through which are dispatched the information in the other transmission direction.

While the principles of the above invention have been described in connection with specific embodiments and particular modifications thereof it is to be clearly understood that this description is made by way of example and not as a limitation of the scope of the invention.

What is claimed is:

1. A time-division multiplex switching system comprising a set of incoming and a set of outgoing junctions, each said incoming and outgoing junction comprising a plurality of synchronous incoming and outgoing channels respectively, with each channel corresponding to a different time position in a recurrent time cycle, switching means and associated control means for establishing a connection between any calling incoming channel and an outgoing channel having the same time position on a desired outgoing junction, first means in said control means operable responsive to the last-said channel having the same time position as any other calling incoming channel on the calling incoming junction, for operating the switching means to shift the said connection to a different outgoing channel in the desired outgoing junction, and second means in said control means responsive to the shifted connection to the outgoing channel on the desired outgoing junction being connected with a calling incoming channel on a different calling incoming junction for operating the switching means to invert the last said connections.

2. A time-division multiplex switching system as set forth in claim 1 wherein the said first means includes means operable responsive to the outgoing channel on the desired outgoing junction having a time position corresponding to the time position of any other calling channel on the calling incoming junction for opening the said connection and establishing a new connection between the calling incoming channel and an outgoing channel on the desired outgoing junction which does not have the same time position as any other calling incoming channel on the calling incoming junction.

3. A time-division multiplex switching system as set forth in claim 2 wherein the said second means includes means responsive to the newly connected out-going channel being connected to a calling incoming channel on a different incoming junction for selecting an outgoing channel in the desired outgoing junction which does not have the same time position as any other calling incoming channel on the said different incoming junction and for transferring the connection of the calling incoming channel on the said different incoming junction to the said selected outgoing channel.

4. In a time-division multiplex switching system as set forth in claim 1, storage circuits for respective ones of said incoming junctions, each storage circuit having a separate store therein for each of said time positions, means for recording intelligence information received over associated calling incoming channels in the corresponding time position store of the associated storage circuit, means for extracting the said recorded intelligence from the incoming store at a time position corresponding to the time position of the outgoing channel in the said desired outgoing junction over which a connection is to be established, and means including the said switching means for transmitting the said extracted information to the last-said outgoing channel.

5. A time-division multiplex switching system as set forth in claim 4 wherein each said storage circuit includes a separate store for recording the identity of the said desired junction and the identity of a channel thereon over which the connection is to be established and wherein the said means for extracting is controlled by the said stored identities.

6. A time-division multiplex switching system as set forth in claim 5 wherein said storage circuit includes a plurality of arrays of ferro-magnetic memory elements and wherein the stored intelligence and identities are stored in respective arrays.

References Cited in the file of this patent

UNITED STATES PATENTS

| | | |
|---|---|---|
| 2,603,714 | Meacham | July 15, 1952 |
| 2,917,583 | Burton | Dec. 15, 1959 |
| 2,931,863 | Faulkner | Apr. 5, 1960 |
| 2,946,044 | Bolgiano | July 19, 1960 |